(12) United States Patent
Fischer

(10) Patent No.: US 7,239,844 B2
(45) Date of Patent: Jul. 3, 2007

(54) WIRELESS LOCAL AREA NETWORK SUPPORTING MULTIPLE SLOT TIMES

(75) Inventor: Matthew James Fischer, Mountain View, CA (US)

(73) Assignee: Broadcom Corporation, Irvine, CA (US)

(*) Notice: Subject to any disclaimer, the term of this patent is extended or adjusted under 35 U.S.C. 154(b) by 714 days.

(21) Appl. No.: 10/462,116

(22) Filed: Jun. 13, 2003

(65) Prior Publication Data
US 2004/0246932 A1   Dec. 9, 2004

Related U.S. Application Data

(60) Provisional application No. 60/425,462, filed on Nov. 11, 2002.

(51) Int. Cl.
*H04H 1/00* (2006.01)

(52) U.S. Cl. ............... 455/3.01; 455/455; 455/502; 455/515

(58) Field of Classification Search .......... 455/3.01, 455/414.3, 426.1, 434, 435.3, 446, 450, 452.1, 455/452.2, 453, 455, 502, 515, 517, 3.04, 455/3.03, 550.1, 552.1, 524; 370/468, 465, 370/338, 477, 411, 445, 349, 401, 509
See application file for complete search history.

(56) References Cited

U.S. PATENT DOCUMENTS

| | | | |
|---|---|---|---|
| 2002/0105970 A1* | 8/2002 | Shvodian | 370/468 |
| 2002/0163933 A1* | 11/2002 | Benveniste | 370/465 |
| 2003/0012166 A1* | 1/2003 | Benveniste | 370/338 |
| 2003/0163579 A1* | 8/2003 | Knauerhase et al. | 709/230 |

* cited by examiner

*Primary Examiner*—Edward F. Urban
*Assistant Examiner*—John J. Lee
(74) *Attorney, Agent, or Firm*—Garlick Harrison & Markison; Bruce E. Garlick

(57) ABSTRACT

A Wireless Local Area Network (WLAN) supports multiple slot times. A Basic Service Set (BSS)/Independent Basic Service Set (IBSS) of the WLAN services a plurality of WLAN devices (STAs) and at least one STA of the plurality of STAs supports multiple slot times. Operation is initiated using a short slot time. Then, the a determination is made that operation of the BSS/IBSS requires use of a long slot time, wherein the long slot time is longer than the short slot time. Operation of at least one of the plurality of STAs is modified to be consistent with the long slot time. In altering the operation the STA sets a local Long Slot Termination Time (LSTT). When a Target Beacon Transition Time (TBTT) is before the local LSTT, a beacon is transmitted that indicates that the long slot time is to be used and that includes the local LSTT. When the TBTT is after the local LSTT, a beacon is transmitted that indicates that the short slot time is to be used.

33 Claims, 9 Drawing Sheets

WIRELESS LOCAL AREA NETWORK SUPPORTING MULTIPLE SLOT TIMES

CROSS REFERENCE TO PRIORITY APPLICATION

This application claims priority to U.S. Provisional Application Ser. No. 60/425,462, filed Nov. 11, 2002, which is incorporated herein by reference in its entirety for all purposes.

FIELD OF THE INVENTION

This invention relates generally to the operation of wireless local area networks; and more particularly to the management of wireless local area networks that service both legacy and next generation devices.

BACKGROUND OF THE INVENTION

Communication technologies that link electronic devices in a networked fashion are well known. Examples of communication networks include wired packet data networks, wireless packet data networks, wired telephone networks, wireless telephone networks, and satellite communication networks, among other networks. These communication networks typically include a network infrastructure that services a plurality of client devices. The Public Switched Telephone Network (PSTN) is probably the best-known communication network that has been in existence for many years. The Internet is another well-known example of a communication network that has also been in existence for a number of years. These communication networks enable client devices to communicate with one another other on a global basis. Wired Local Area Networks (wired LANs), e.g., Ethernets, are also quite common and support communications between networked computers and other devices within a serviced area. Wired LANs also often link serviced devices to Wide Area Networks and the Internet. Each of these networks is generally considered a "wired" network, even though some of these networks, e.g., the PSTN, may include some transmission paths that are serviced by wireless links.

Wireless networks have been in existence for a relatively shorter period. Cellular telephone networks, wireless LANs (WLANs), and satellite communication networks, among others, are examples of wireless networks. Relatively common forms of WLANs are IEEE 802.11(a) networks, IEEE 802.11(b) networks, and IEEE 802.11(g) networks, referred to jointly as "IEEE 802.11 networks." In a typical IEEE 802.11 network, a wired backbone couples to a plurality of Wireless Access Points (APs), each of which supports wireless communications with computers and other wireless terminals that include compatible wireless interfaces within a serviced area. The wired backbone couples the APs of the IEEE 802.11 network to other networks, both wired and wireless, and allows serviced wireless terminals to communicate with devices external to the IEEE 802.11 network. Devices that operate consistently with an IEEE 802.11 protocol also typically support ad-hoc networking in which wireless terminals communicates directly to one another without the presence of an AP.

WLANs provide significant advantages when servicing portable devices such as portable computers, portable data terminals, and other devices that are not typically stationary and able to access a wired LAN connection. However, the data rates provided by IEEE 802.11(b) networks are less than those data rates provided by even older wired LANs. Thus, in order to provide greater data rates, WLANs are often upgraded to newer available technologies, e.g., IEEE 802.11(g). WLANs that are upgraded to meet the IEEE 802.11(g) standard typically must also support legacy IEEE 802.11(b) devices in the shared 2.4 GHz ISM band.

Problems exist when supporting legacy devices. One particular problem relates to the differing slot times supported by the IEEE 802.11(b) and the IEEE 802.11(g) devices. IEEE 802.11(g) devices, which use a 9 μs slot time, have an advantage over IEEE 802.11(b) devices, which use a longer 20 μs slot time, when accessing a shared channel. Such is the case because in the Carrier Sense Multiple Access (CSMA) with Collision Detection and Random Backoff operations employed by both IEEE 802.11(b) and IEEE 802.11(g) devices, the IEEE 802.11(g) devices will attempt to access the shared channel sooner after a collision than will the IEEE 802.11(b) devices. Thus, the IEEE 802.11(g) devices will have an unfair advantage in accessing the shared channel.

Thus, there is a need in the art for operations that will allow legacy devices and next generation devices to share channels in a service area supported by a WLAN in a fair and equitable manner.

SUMMARY OF THE INVENTION

In order to overcome the shortcomings of the prior devices, among other shortcomings, a Wireless Local Area Network (WLAN) of the present invention supports multiple slot times. A Basic Service Set (BSS)/Independent Basic Service Set (IBSS) of the WLAN services a plurality of WLAN devices (STAs, either APs or wireless terminals) and at least one STA of the plurality of STAs supports multiple slot times. The method of the present invention includes initiating operation of the BSS/IBSS of the WLAN using a short slot time. Then, the method includes determining that operation of the BSS/IBSS requires use of a long slot time, wherein the long slot time is longer than the short slot time. Finally, the method includes altering operation of at least one of the plurality of STAs to be consistent with the long slot time.

In altering the operation of the at least one STA, the method includes setting a local Long Slot Termination Time (LSTT). Then, when a Target Beacon Transition Time (TBTT) is before the local LSTT, the method includes transmitting a beacon that indicates that the long slot time is to be used and that includes the local LSTT. In addition, when the TBTT is after the local LSTT, the method includes transmitting a beacon that indicates that the short slot time is to be used.

The method of the present invention may further include receiving a beacon from another STA of the plurality of STAs, wherein the beacon includes a remote LSTT. When the remote LSTT precedes the local LSTT, the method includes ignoring the remote LSTT. Further, when the remote LSTT is later than the local LSTT, the method includes writing the remote LSTT as the local LSTT. The beacon may also include an indication that the long slot time is to be used.

Determining that operation of the BSS/IBSS requires use of a long slot time may include identifying a STA that associates with the BSS/IBSS and that requires operation with the long slot time. Alternately determining that operation of the BSS/IBSS requires use of a long slot time may include identifying a co-channel BSS that requires operation with the long slot time and determining that a service area of the co-channel BSS overlaps with a service area of the BSS/IBSS.

When a beacon is received from a co-channel BSS/IBSS STA that includes a remote LSTT and a Timing Synchronization Function (TSF), the method includes normalizing the remote LSTT based upon the TSF to produce a normalized remote LSTT. Then, when the normalized remote LSTT precedes the local LSTT, the method includes ignoring the remote LSTT. Further, when the normalized remote LSTT is later than the local LSTT, the method includes writing the normalized remote LSTT as the local LSTT. The beacon that is received from the co-channel BSS/IBSS STA may also include an indication that the long slot time is to be used, but that indication is ignored by the receiving STA.

Further, determining that operation of the BSS/IBSS requires use of a long slot time may include identifying a co-channel IBSS that requires operation with the long slot time. Further, setting the local LSTT includes setting the local LSTT to the sum of a Target Beacon Transition Time (TBTT) and a Minimum Long Slot Epoch (MLSE). A Wireless Access Point (AP) or wireless terminal may be constructed, programmed, or otherwise configured to perform the operations of the present invention.

Thus, according to the present invention, when a STA is present within the coverage area of the BSS/IBSS, operation moves from being consistent with the short slot time to being consistent with the long slot time. With operation modified in this way, when STAs that require the long slot time are present, all STAs will operate with the long slot time to avoid unfairness in accessing the channel. Then, after the STA requiring the long slot time is known to be gone, via the system time being greater than LSTT, operation will transition back to the short slot time.

In an alternate embodiment, instead of passing LSTT around, a timer value would be passed in the beacon. Then, each STA would set a local counter to the counter value and, when the local counter counted down, the STA would operate with the short slot time. This alternate embodiment also results in the STAs moving from the long slot time to the short slot time substantially in unison.

Other features and advantages of the present invention will become apparent from the following detailed description of the invention made with reference to the accompanying drawings.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE DRAWINGS

Figure 1:
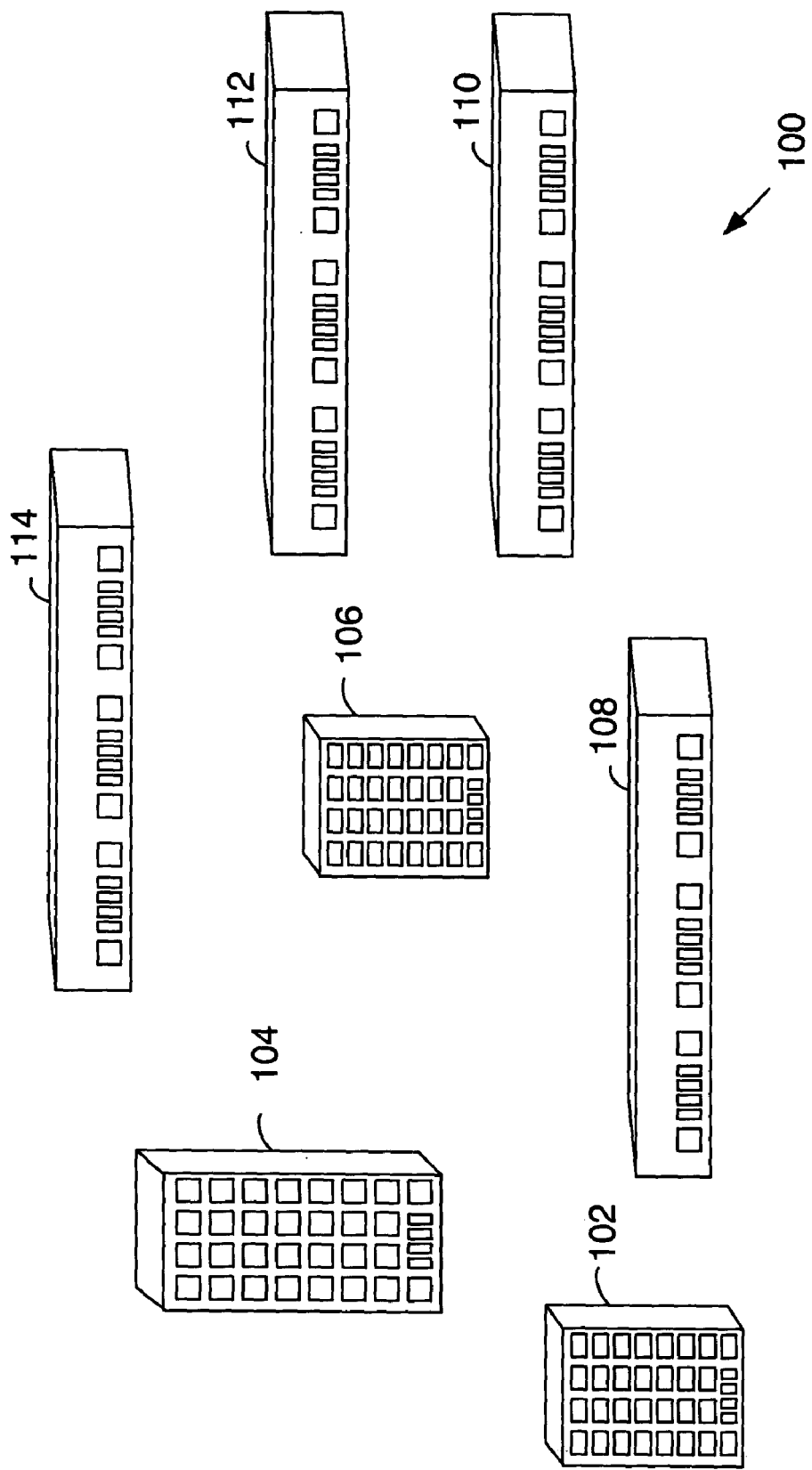
FIG. 1 is a system diagram illustrating a premises in which a Wireless Local Area Network (WLAN) constructed according to the present invention is deployed.

FIG. 1 is a system diagram illustrating a premises 100 in which a Wireless Local Area Network (WLAN) constructed according to the present invention is deployed. The premises 100 (campus) includes office buildings 102, 104, 106 and industrial buildings 108, 110, 112, and 114. The premises 100 may correspond to a company such as a technology company, a seller of goods, a service company, or another type of company. Contained within each of the office buildings 102, 104, and 106 are a number of offices, each of which provides a working space for at least one person. Each of the industrial buildings 108, 110, 112, and 114 provides space for manufacturing, storage, and/or another purpose. People also work within industrial buildings 108, 110, 112, and 114.

Contained within each of these buildings 102–114 are computer workstations, computer servers, printers, FAX machines, phones, and other electronic devices. Each of these electronic devices has its communication requirements. For example, computer workstations, computer servers, and printers each require data communication service. Such data communication service requires that the devices can communicate with other devices located within the premises 100 and with devices located external to the premises 100 across one or more data networks. The FAX machines and phones require coupling to one another and to the Public Switched Telephone Network (PSTN).

According to the present invention, WLAN operations are supported within each of the buildings 102–114 and elsewhere within the premises. Such operation includes the support of next generation WLAN devices, e.g., IEEE 802.11(g) devices as well as legacy WLAN devices, e.g., IEEE 802.11(b) devices, in a single shared spectrum, e.g., the 2.4 GHz ISM band. According to the present invention, when using a shorter slot time is allowable, a shorter slot time will be used to increase the data rate supportable by the WLAN. However, further according to the present invention, when a longer slot time is required in the service of legacy devices, the longer slot time will be employed. Finally, according to the present invention, when the longer slot tie is no longer required to service the legacy devices, the WLAN will be operated with the shorter slot time. A better understanding of the manner in which these operations are accomplished will be gained by the following description made with reference to FIGS. 2–7.

Figure 2:
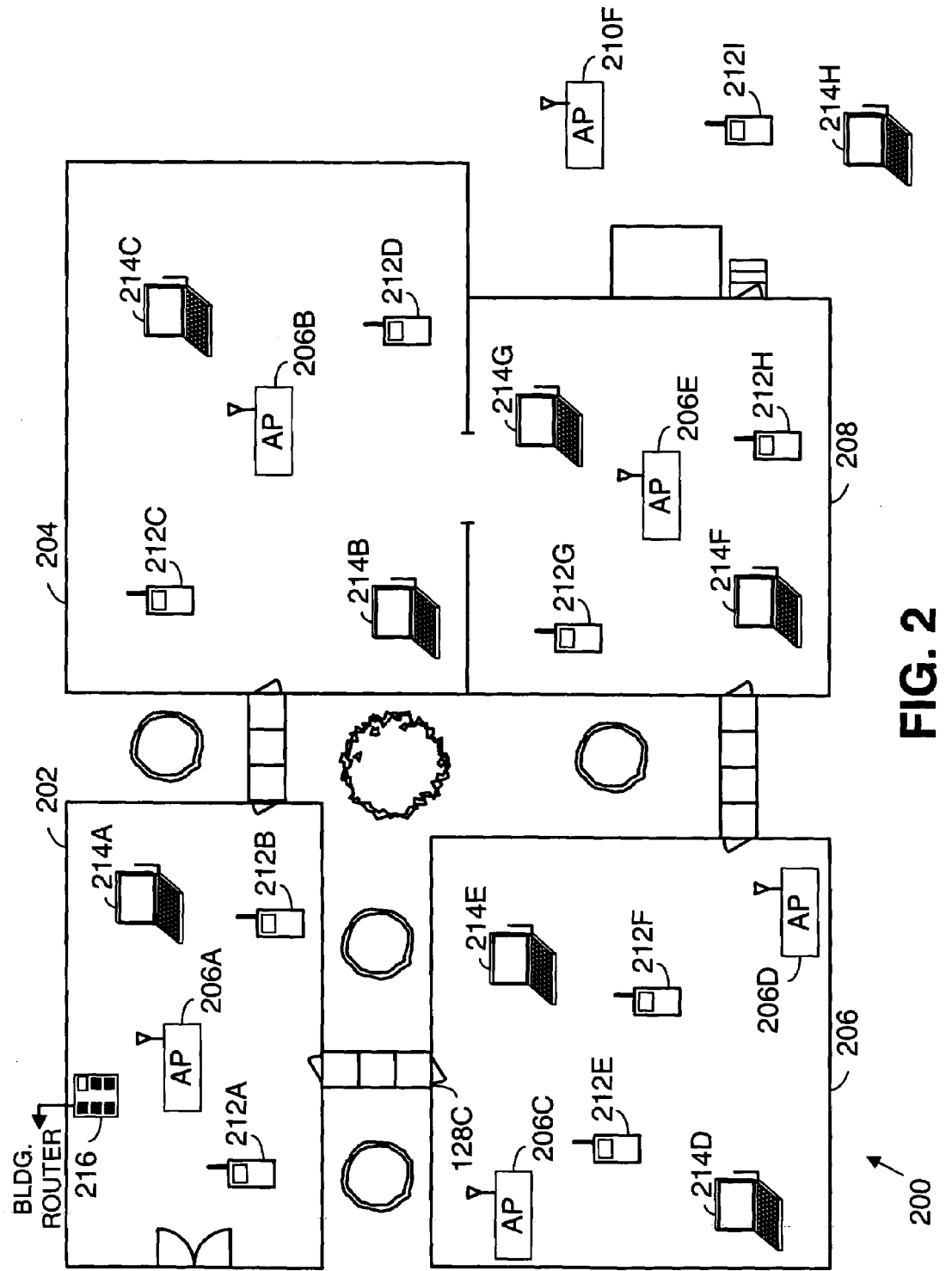
FIG. 2 is a partial system diagram illustrating a portion of the campus of FIG. 1 in which wireless communications are serviced according to the present invention.

FIG. 2 is a partial system diagram illustrating a portion of the campus of FIG. 1 in which wireless communications are serviced according to the present invention. A building floor 200 shown in FIG. 2 may be a lower floor of one of the buildings of FIG. 1, e.g., building 102. The building floor 200 includes a plurality of rooms 202, 204, 206, and 208. Each of these rooms 202, 204, 206, and 208 has placed therein Wireless Access Points (APs) 206A, 206B, 206C, 206D, and 206E, respectively, that service corresponding areas. Further, an external AP 206F services an area external to room 208 of building floor 200. Each of these APs 206A–206F couples to a wired network infrastructure that may include a building router 216.

Serviced within the building floor 200 are wireless telephones/data terminals 212A–212I and laptop computers 214A–214H, together "wireless terminals" or stations (STAs). Each of these wireless terminals wirelessly communicates with a servicing AP. For example, laptop computer 214A and wireless terminals 212A and 212B wirelessly communicate with AP 206A (in their illustrated positions). Each of the APs 206A–206E supports wireless communications primarily within a designated area respectively. However, the coverage area of each AP 206A–206E extends beyond the boundaries of the serviced rooms 202–208 so that overlapping coverage areas exist. For example, APs 206A and 206C provide service between rooms 202 and 206 so that wireless terminals that roam between the rooms continue to receive wireless communication service when between the rooms 202 and 206. Further, AP 206E supports wireless communications outside of the floor 200 to service laptop computer 214H and wireless terminal 212I. Some or all of the STAs may also support ad-hoc networking in which they communicate directly, without AP interaction.

Figure 3:
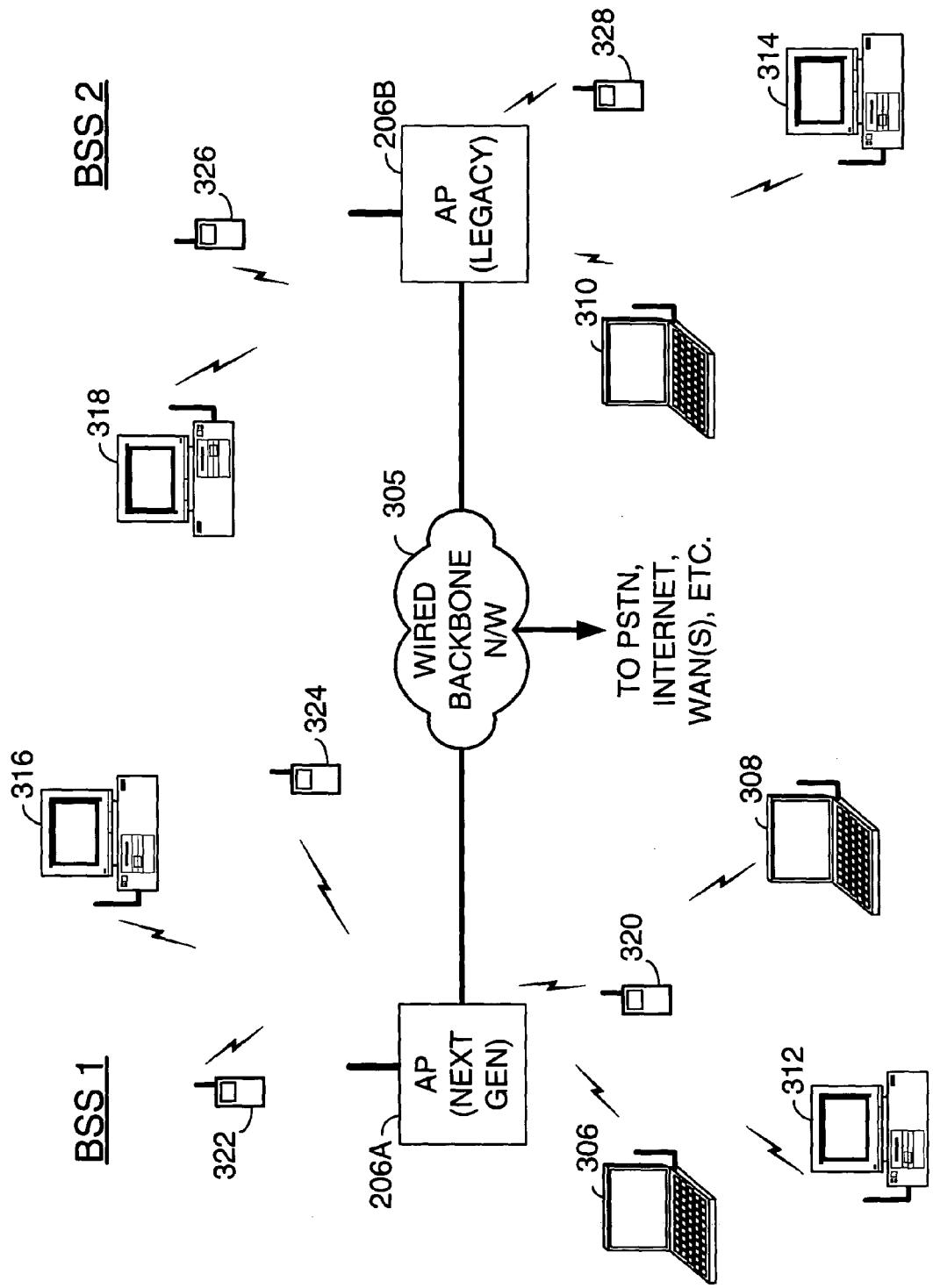
FIG. 3 is a partial system diagram illustrating a portion of a campus in which wireless communications are serviced according to the present invention.

FIG. 3 is a partial system diagram illustrating a portion of the WLAN servicing the building floor of FIG. 2. The portion of the WLAN shown includes APs 206A and 206B that support wireless communications within a serviced area, for example, the rooms 202 and 204 of FIG. 2. The APs 206A and 206B couple to a wired backbone network 305. The APs 206A and 206B service wireless communications for laptop computers 306, 308, and 310, desktop computers 312, 314, 316, and 318, and wireless telephones/data terminals 320, 322, 322, 324, 326, and 328, together STAs. Note that while different numbering is used for the wireless terminals of FIG. 3, they are the same as, or similar to wireless terminals of FIG. 2. Service coverage areas supported by APs 206A and 206B partially overlap. The wired backbone network 305 couples to one or more data networks. The WLAN of FIG. 3 supports both legacy operations, e.g., IEEE 802.11(b), and next generation operations, e.g., IEEE 802.11(g).

Each wireless device (wireless card) in an IEEE 802.11 network, both wireless terminals and APs, includes a STA interface (STA). A collection of STAs that communicate with one another is known as a Basic Service Set (BSS), which covers a certain Basic Service Area (BSA). In the example of FIG. 3, BSS 1 (BSA 1) resides generally in the left portion of the FIG. 3 and BSS 2 (BSA 2) resides generally in the right portion of the FIG. 3. BSA 1 and BSA 2 may overlap. In such case, STAs in the overlapping region may communicate within either or both of BSS 1 and BSS 2. Stations that are not within a particular BSA can't directly participate in the BSS with the other STAs in the BSS.

When STAs are participating in a BSS, they share a common set of network parameters. They all transmit/receive on the same channel, they understand the same data rates, they use a common BSSID, and they are synchronized in time to the same timer. In a BSS, all of those parameters are broadcast in beacon frames that are sent at a regular interval. Two BSSs may coincidentally share the same channel, common data rates, and timer, so some unique identifier is necessary. The unique identifier is a 6-byte number that identifies the BSS (the BSSID). Packets in a BSS, in addition to being addressed from one STA to another, also include the BSSID.

There are two kinds of BSSs: the independent BSS (IBSS) and the infrastructure BSS. An IBSS is usually an ad-hoc network and supports peer-to-peer networking. In an IBSS, all of the STAs are responsible for sending beacons, and the BSSID is randomly generated. In an infrastructure BSS, there is exactly one Wireless Access Point (AP). In an infrastructure BSS, when one STA wishes to send data to another STA, the packet is sent first to the AP, and then the AP delivers the packet. The BSSID of an infrastructure BSS is the MAC address of the AP's STA interface, and the AP is the only STA that sends out beacons. The AP is sometimes known as the BSS master, and the other STAs are BSS clients. In an IBSS, the wireless terminals of the IBSS share beaconing duties that are performed only by the AP in a BSS.

According to the present invention, the WLAN of FIG. 3 includes STAs that support differing slot times. For example, IEEE 802.11(b) devices support 20 μs slot times while some IEEE 802.11(g) devices support 9 μs slot times. In order to provide backwards compatibility, all of the IEEE 802.11(g) STAs of the WLAN of FIG. 3 support 20 μs slot times. Further, one or both of the APs 206A and 206B support both 20 μs slot times and 9 μs slot times. The operations of the present invention apply to both the operation of APs that support multiple slot times and to STAs that support multiple slot times.

Figure 4A:
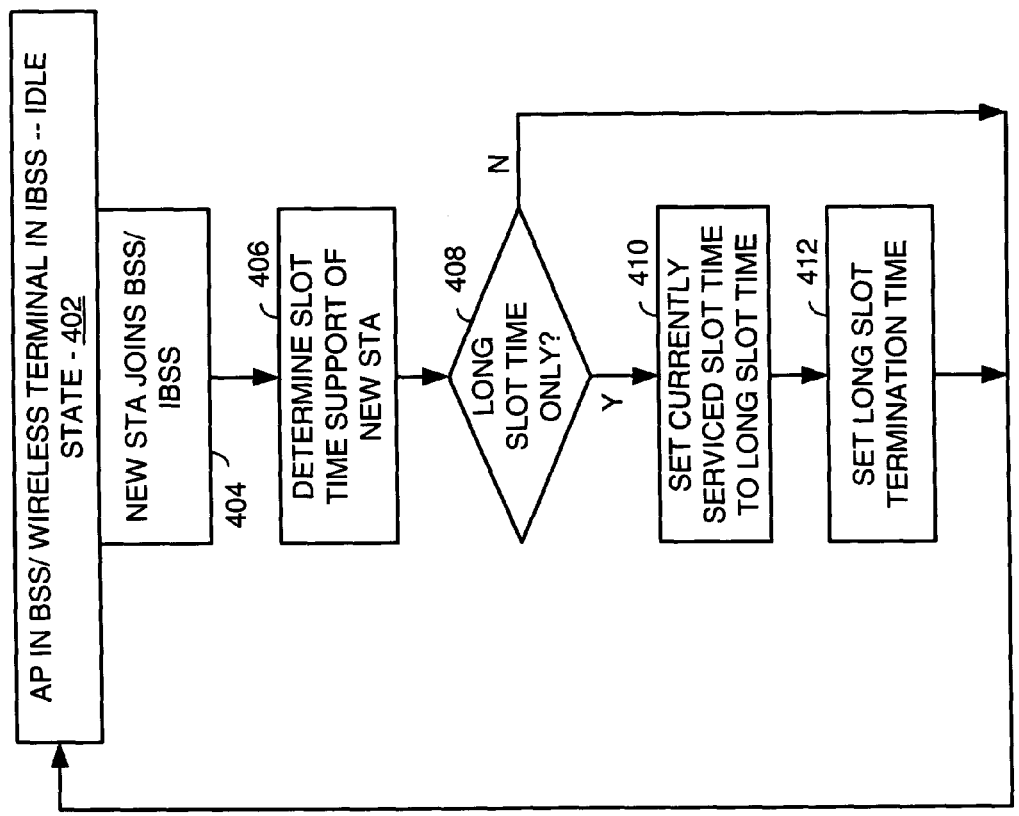
FIG. 4A is a flow chart illustrating operations of an AP servicing a BSS and/or of a wireless terminal operating in an IBSS according to the present invention.

FIG. 4A is a flow chart illustrating operations of an AP servicing a BSS and/or of a wireless terminal operating in an IBSS according to the present invention. Operation commences at step 402 where the AP of the BSS/wireless terminal of the IBSS is in an idle state or is performing operations in addition to the operations of the present invention (step 402). The AP/wireless terminal whose operations are described with reference to FIG. 4A supports both a short slot time, e.g., 9 μs, and a long slot time, e.g., 20 μs. In its "normal" operations, the AP/wireless terminal operates with the short time slot but supports both short time slot and long time slot operations.

During its operations, the AP communicates with wireless terminals and may communicate with other APs. The wireless terminal of the IBSS communicates with other wireless terminals in the IBSS. In one of these operations, a new STA joins the BSS via communication with the AP or a new STA joins the BSS via communication with a wireless terminal of the IBSS (step 404). When the new STA joins the BSS, the AP/wireless terminal determines the slot time supported by the new STA (step 406). If the new STA is a legacy device, e.g., IEEE 802.11(b) device, for example, the new STA will support only the longer slot time of 20 μs. Thus, at step 408, the AP/wireless terminal determines whether the new STA supports only the long slot time. If the new STA supports the short time slot (or the short time slot and the long time slot), the AP/wireless terminal determines that the currently serviced slot time (short slot time) will be used. Note that the currently serviced slot time will be the short slot time, e.g., 9 μs, upon initiation of the IEEE 802.11(g) network and upon the addition of IEEE 802.11(g) STAs that support the 9 μs slot time. The short slot time will be the basic slot time for the IEEE 802.11(g) network, which supports both the 20 μs, and the 9 μs slot times. The basic slot time for the IEEE 802.11(g) network will be signaled in each beacon. The currently serviced slot time for the network will be determined by combining the basic slot time information with the LSTT information.

If the new STA supports only the long slot time, e.g., 20 μs, the AP/wireless terminal will set the currently serviced slot time for the BSS (or IBSS) to the long slot time (step

410). The AP/wireless terminal will also set its local Long Slot Termination Time (LSTT) to the greater of the current value of LSTT and the current TSF time+MLSE (step 412). The LSTT indicates at what time (in BSS/IBSS time) operation of the BSS/IBSS will revert from the long slot time, e.g., 20 µs, to the basic slot time, i.e., the short slot time, e.g., 9 µs. The basic slot time for the network may continue to be indicated as the short slot time, but the LSTT value will indicate the duration of time during which the currently serviced slot time will take the value of the long slot time.

Figure 4B:
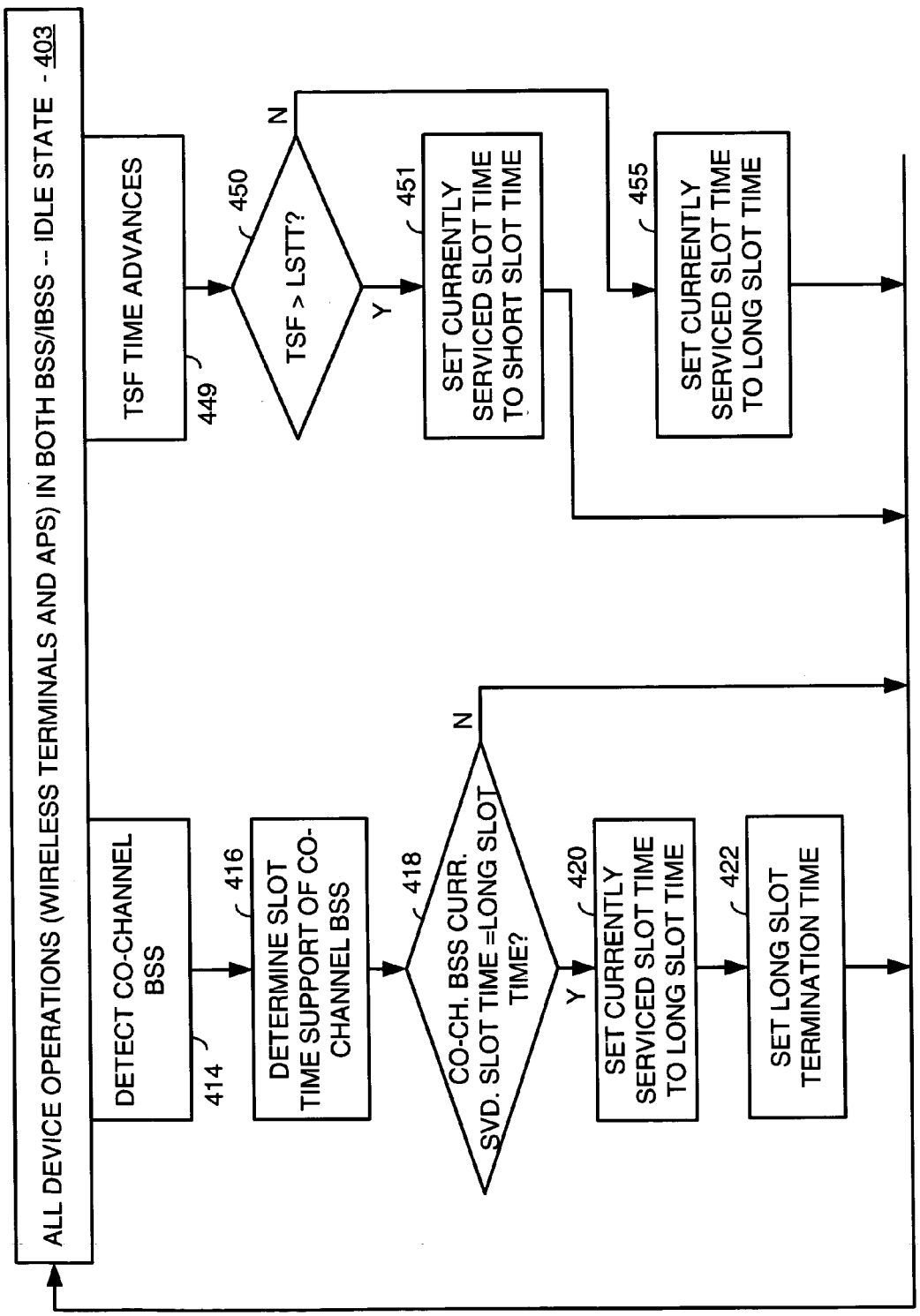
FIG. 4B is a flow chart illustrating additional operations performed by all APs and wireless terminals according to the present invention.

FIG. 4B is a flow chart illustrating additional operations performed by all APs and wireless terminals according to the present invention. As will be recalled, a problem with operating a WLAN that supports both current version devices, e.g., IEEE 802.11(g) devices, and legacy devices, e.g., IEEE 802.11(b) devices, in a single band is that a latch up at the long slot time may occur. Thus, in order to overcome this problem, the LSTT is set and, when the LSTT is reached, operation reverts to the basic slot time, i.e., the short slot time. When a STA that supports only the long slot time is detected, operation proceeds to setting the currently serviced slot time to the long slot time. Then, after a reasonable period, e.g., 1 second, of no activity by the long slot time STA operation reverts to setting the currently serviced slot time to the short slot time. The expiration of such a reasonable period corresponds to the LSTT.

Referring to FIG. 4B, all APs and wireless terminals operating according to the present invention may transition from idle operations (step 403) to long slot operations when the AP/wireless terminal detects a co-channel BSS (step 414). At step 416, the AP/wireless terminal determines the slot time supported by the co-channel BSS. Then, at step 418 the AP/wireless terminal determines whether the slot time supported by the co-channel BSS is the long slot time. If the supported slot time is not the long slot time, the operations of the STA continue with the currently serviced short slot time. However, if the slot time supported by the co-channel BSS is the long slot time, e.g., 20 µs, the AP/wireless terminal will keep the basic slot time for the BSS (or IBSS) set to the short slot time, but change the currently-serviced slot time to the long slot time (step 420). The STA will set its local LSTT to the greater of the current value of LSTT and the current TSF time+MLSE (step 422) to indicate that the long slot time will be used/beaconed for the period of the remaining LSTT.

When the Timing Synchronization Function (TSF) time advances (step 449), the AP/wireless terminal must examine the LSTT (step 450) to determine if the current local LSTT value is less than the current TSF value. If the current local LSTT value is less than the current TSF value, then the AP/wireless terminal will set the currently serviced slot time to be equal to the basic slot time, i.e., short slot time (step 451). If the current local LSTT value is greater than the current TSF value, then the AP/wireless terminal will set the currently serviced slot time to the long slot time (step 455).

Figure 5A:
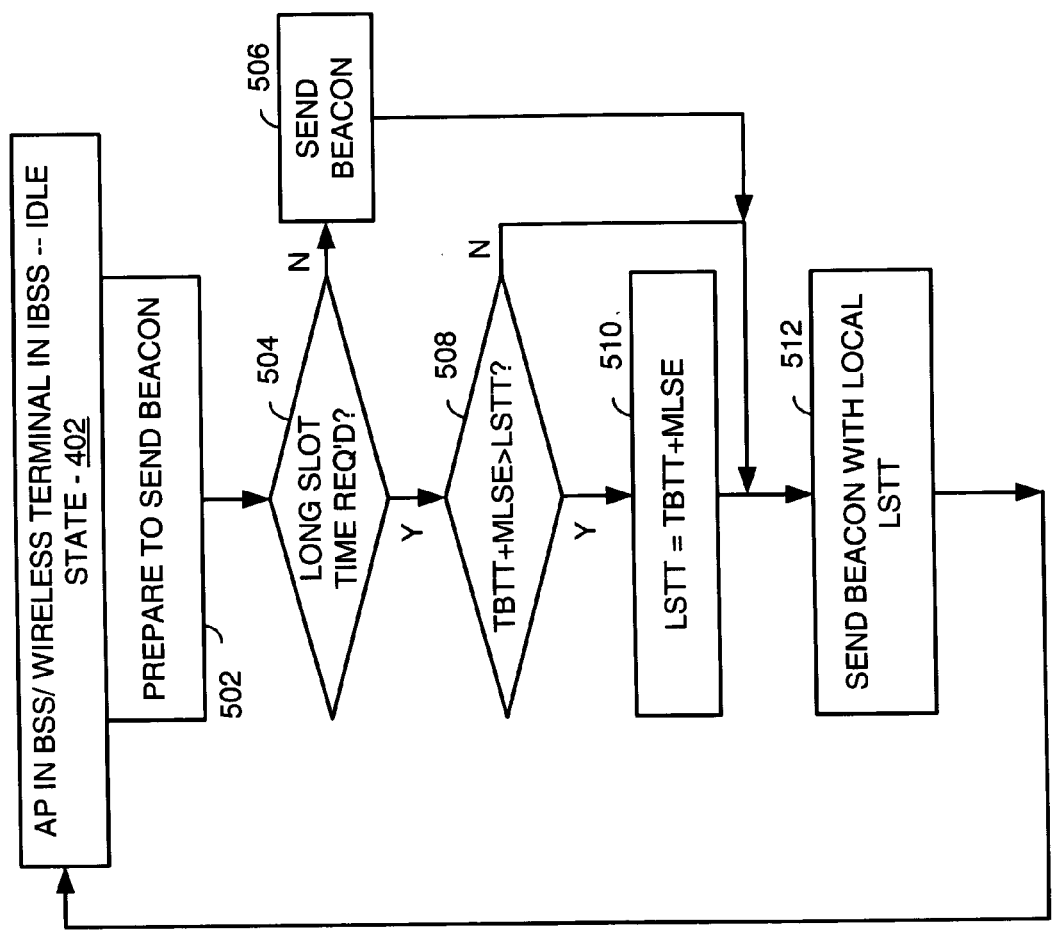
FIG. 5A is a flow chart illustrating beacon sending operations of an AP servicing a BSS and/or of a wireless terminal operating in an IBSS according to the present invention.

FIG. 5A is a flow chart illustrating beacon sending operations of an AP servicing a BSS and/or of a wireless terminal operating in an IBSS according to the present invention. An AP/wireless terminal that operates according to FIG. 5A receives beacons and may transmit beacons. As was previously described, in a BSS only the AP transmits beacons. However, in an IBSS, each wireless terminal transmits beacons. A function of these beacons according to the present invention is to ensure that all WLAN participants in the BSS/IBSS use a correct slot time of the BSS/IBSS. According to the present invention, APs/wireless terminals in the BSS/IBSS commence operations using the short slot time, transition to the long slot time when required/directed, and then transition back to the short slot time at substantially the same time.

In preparing to send a beacon (step 502), the AP/wireless terminal first determines whether a long slot time is required (step 504). If it is known to the AP/wireless terminal that a STA participating in the BSS/IBSS requires the long slot time, or that a co-channel BSS requires the long slot time, the AP/wireless terminal determines that long slot time operations are required and operation proceeds to step 508. Generally, long slot time operations are required when the local LSTT is greater than the Timing Synchronization Function (TSF) of the BSS/IBSS. If short slot time operations may be performed, operation proceeds to step 512 where a beacon is sent indicating that short slot time operations are to be performed, either by sending a beacon with LSTT<TSF, or by sending a special, reserved LSTT value, either of which indicates that the currently serviced slot time is equal to the basic slot time. Basic slot time is signaled through a separate means within the same beacon.

If long slot time operations are required, as determined at step 504, it is next determined whether the local LSTT is less than the sum of the Target Beacon Transition Time (TBTT) and the Minimum Long Slot Epoch (MLSE) (step 508). If TBTT+MLSE is not greater than the local LSTT, the beacon is sent with the current value of the local LSTT (step 512). If TBTT+MLSE is greater than LSTT, as determined at step 508, the local LSTT is set to be equal to (or less than) the sum of TBTT and MLSE. A beacon is then sent at step 512 that includes the local LSTT and an indication of the basic slot time.

Figure 5B:
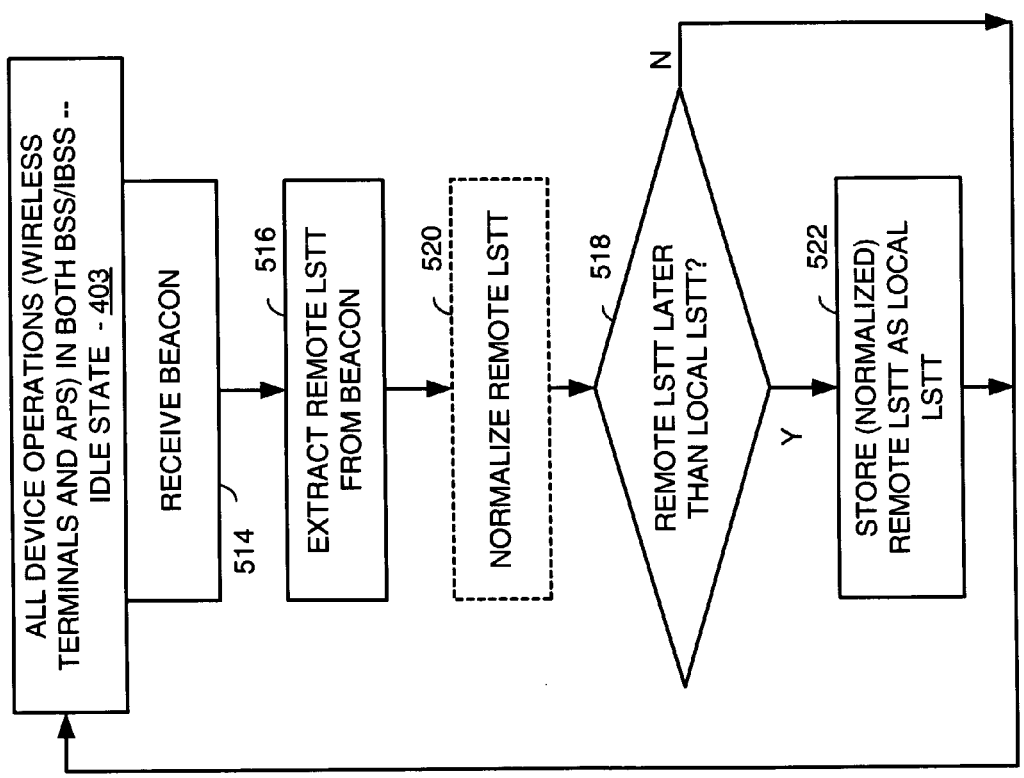
FIG. 5B is a flow chart illustrating beacon receiving operations performed by all APs and wireless terminals according to the present invention.

FIG. 5B is a flow chart illustrating beacon receiving operations performed by all APs and wireless terminals according to the present invention. At step 514, an AP/wireless terminal receives a beacon 514 from an AP (BSS) or another wireless terminal (IBSS). The STA then extracts a remote LSTT from the beacon (step 516). Note that the LSTT received from the other AP/wireless terminal is referred to as a remote LSTT while the LSTT stored locally is referred to as the local LSTT. If the remote LSTT 520 is received from a foreign IBSS/BSS, e.g., "foreign beacon,", e.g. from a BSS of which the STA is not a member, then the remote LSTT contained in the foreign beacon is normalized based upon the TSF also contained in the foreign beacon (step 520). If the (normalized) remote LSTT is not later than the local LSTT, operation proceeds to step 402. However, if the (normalized) remote LSTT is later than the local LSTT, the (normalized) remote LSTT is stored as the local LSTT (step 522).

Note that the operations of steps 502 through 512 of the present invention are performed by both APs and wireless terminals. The operations of steps 514 through 522 are performed by each wireless terminal in an IBSS and by each AP and by each wireless terminal in a BSS. The operations of FIGS. 5A and 5B therefore support consistent slot time operations among all STAs of an BSS/IBSS. The operations of FIGS. 5A and 5B allow neighboring co-channel BSSs/IBSSs to use consistent slot times in servicing legacy devices that are operating in a shared service area. Coordination of the LSTTs and selection of the resolution of the LSTTs must be performed to guarantee that all STAs TSFs will have advanced by at least one LSTT tick between RX of any remote LSTT and the next possible TX of a local LSTT. This constraint will prevent the indefinite advancement of the LSTT propagating in the WLAN. In one embodiment of the present invention, an LSTT field is added to the ERP Information element of a beacon transmission to include an LSSTValid bit and a 23 bit field for the remote LSTT. This set of values allows the MLSE to be as large as 4.19 seconds.

Figure 6:
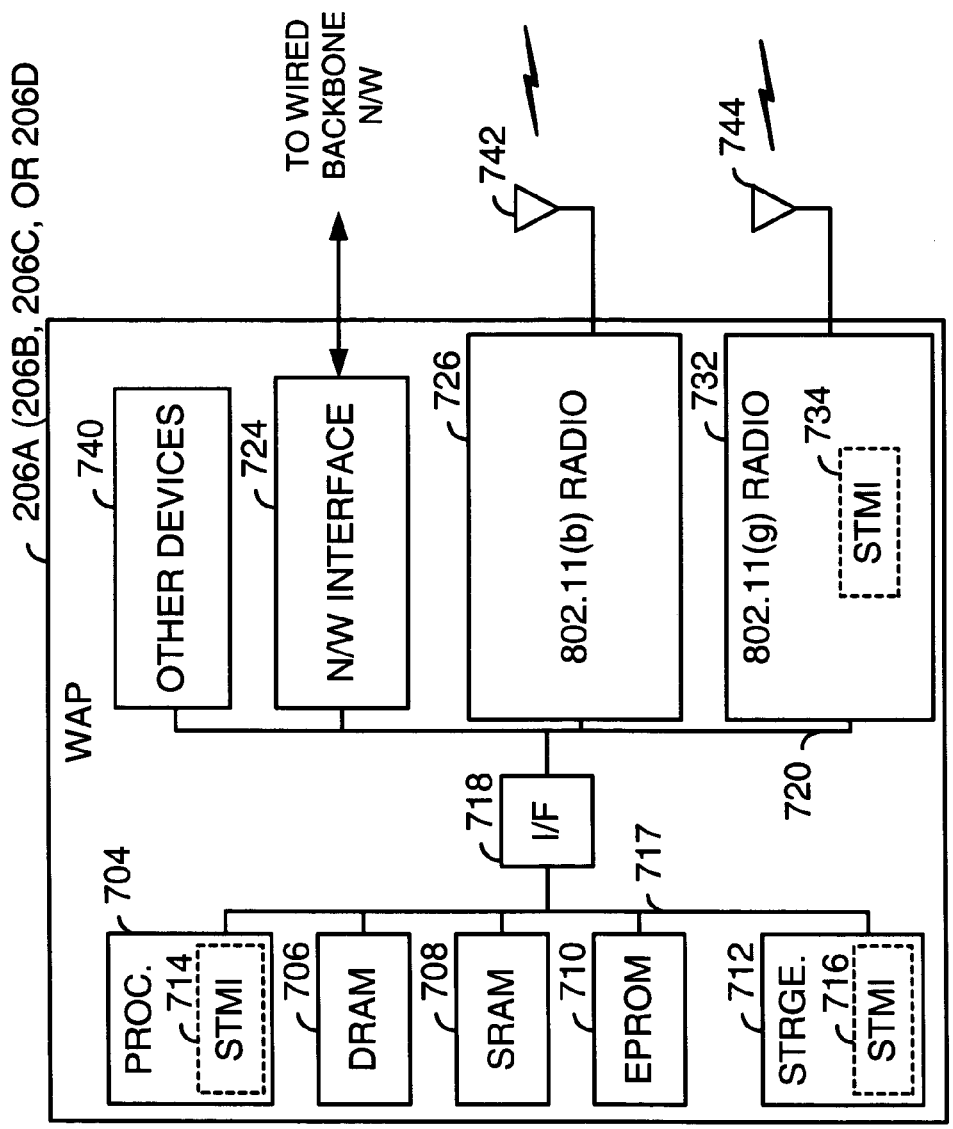
FIG. 6 is a block diagram illustrating a AP constructed according to the present invention.

FIG. 6 is a block diagram illustrating AP 206A, 206B, 206C, or 206D that are constructed according to the present invention. The AP 206A includes a processor 704 and one or more storage devices that may include dynamic RAM 706, static RAM 708, EPROM 710, and/or storage device 712, such as a hard drive, optical drive, tape drive, etc. These components intercouple via a local bus 717 and couple to a peripheral bus 720 via an interface 718. The processor 704 may be any type of processing device capable of executing software instructions. The processor 704 may be a single integrated circuit or a processing module including a plurality of integrated circuits.

The AP 206A also includes a network interface 724, which couples the AP 206A to the wired backbone network 305. The AP 206A also includes an IEEE 802.11(b) radio 726 coupled to antenna 742 and an IEEE 802.11(b) radio 732 coupled to antenna 744. These devices coupled to each other and optionally to other devices 740 via bus 720.

In performing operations according to the present invention, the AP 206A may execute software instructions, i.e., Slot Time Management Instructions (STMI). STMI 714 enable the AP 206A to perform the operations of the present invention. In executing the STMI, the STMI 716 are loaded into the storage unit 712 and some or all of the STMI 714 are loaded into the processor 704 for execution. During this process, some of the STMI 716 may be loaded into the DRAM 706. In other embodiments, however, the AP 206A may operate according to the present invention based upon hardware function, firmware instructions, or a combination of any/all of these.

Figure 7:
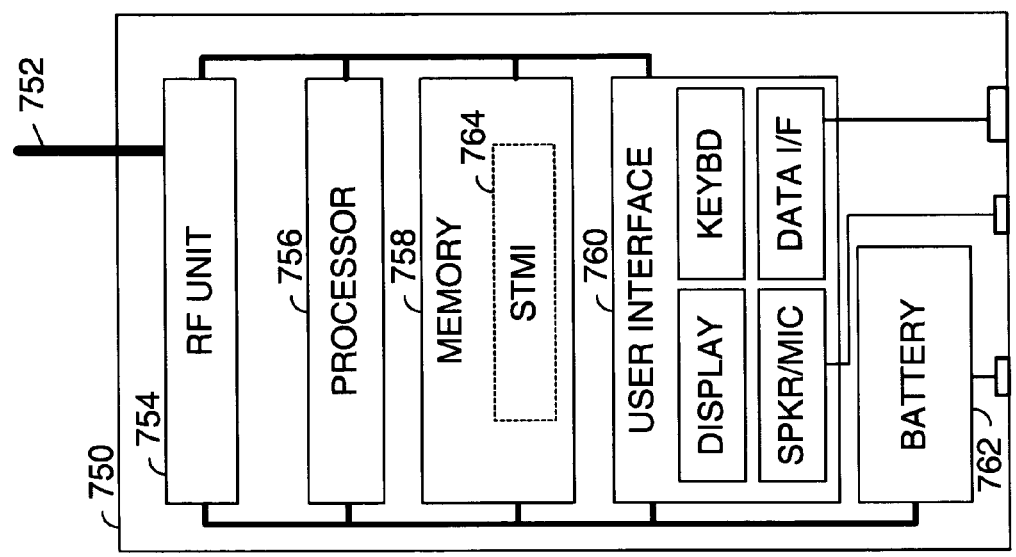
FIG. 7 is a block diagram illustrating the components of a first embodiment of a wireless terminal that operates according to the present invention.

FIG. 7 is a block diagram illustrating the components of a wireless terminal that operates according to the present invention. The wireless terminal 750 includes a RF unit 754, a processor 756, and a memory 758. The RF unit 754 couples to antenna 752 that may be located internal or external to the case of the wireless terminal 750. The processor 756 may be an Application Specific Integrated Circuit (ASIC) or another type of processor that is capable of operating the wireless terminal 750 according to the present invention. The memory 758 includes both static and dynamic components, e.g., DRAM, SRAM, ROM, EEPROM, etc. In some embodiments, the memory 758 may be partially or fully contained upon an ASIC that also includes the processor 756. A user interface 760 includes a display, indicators, a keyboard, a speaker, a microphone, and/or a data interface, and may include other user interface components. The radio 754, the processor 756, the memory 758, and the user interface 760 couple via one or more communication buses/links. A battery 762 also couples to and powers the radio 754, the processor 756, the memory 758, and the user interface 760. The structure of the wireless terminal 750 illustrated is only an example of one wireless terminal structure. Many other varied wireless terminal structures could be operated according to the teachings of the present invention.

In performing the operations of the present invention, the wireless terminal 750 may execute software instructions, i.e., Slot Time Management Instructions (STMI) 764. STMI 764 enable the wireless terminal 750 to perform the operations of the present invention. In executing the STMI, the STMI 764 are loaded from memory 758 into the processor 756 for execution. In other embodiments, however, the wireless terminal 750 may operate according to the present invention based upon hardware function, firmware instructions, or a combination of any/all of these.

The following definitions are added in clause 4:

| | |
|---|---|
| LSTT | Long Slot Termination Time |
| MLSE | Minimum Long Slot Epoch |

The following text is added to clause 7:
7.3 Management Frame Body Components

7.3.1 Fixed Fields

7.3.1.4 Capability Information Field

The text is changed as shown:

A STA which is not a member of an IBSS that wishes to operate with the short slot time shall set the Short Slot Time subfield to the value 1 in transmitted Association Request and Reassociation Request MMPDUs when the MIB attribute dot11ShortSlotTimeOptionImplemented is true. Otherwise, STAs which are not a member of an IBSS, shall set the Short Slot Time subfield to 0 in transmitted Association Request and Reassociation Request MMPDUs.

AP and STA which are members of an IBSS shall set the Short Slot Time subfield to the value 1 in transmitted Beacon and Probe Response MMPDUs when the MIB attribute dot11ShortSlotTimeOptionImplemented is true. Otherwise, AP and STAs which are members of an IBSS, shall set the Short Slot Time subfield to 0 in transmitted Beacon and Probe Response MMPDUs.

Short Slot Time Usage Rules are Given in Subclause 7.3.2.9.

7.3.2.9 NonERP Indication Element

The NonERP Indication Element contains the information on the presence of clause 15 and clause 18 stations in the BSS that are not capable of clause 19 (ERP) data rates and the requirement of the Beacon sender (AP in a BSS or STA in an IBSS) as to the use of protection mechanisms to optimize BSS performance. The sender shall generate this element in each Beacon Frame. The beacon sender shall set b0 (NonERP_present) and b1 (use_protection) according to Table 7.3.2.9. The beacon sender shall set the LSTTValid bit and the LSTT field according to the rules outlined in this subclause. Annex E contains recommendations for the use of this element.

An ERP STA that is aware of a non-ERP STA shall set bit0 of NonERP Indication Element true and transmit this information in a subsequent beacon frame.

TABLE 7.3.2.9

| NonERP Indication Element usage | | |
|---|---|---|
| it b0 | it b1 | Meaning |
| | | No clause 15 or clause 18 (NonERP) stations are associated, and STAs with an ERP should not use protection mechanisms for MPDUs transmitted at one of the ERP rates. |
| | | No clause 15 or clause 18 (NonERP) stations are associated, but STAs with an ERP shall use protection mechanisms for MPDUs transmitted at one of the ERP rates. |
| | | There are clause 15 or 18 (NonERP) stations associated, but STAs with an ERP should not use protection mechanisms for MPDUs transmitted at one of the ERP rates. |

TABLE 7.3.2.9-continued

NonERP Indication Element usage

| it b0 | it b1 | Meaning |
|---|---|---|
| | | There are clause 15 or 18 (NonERP) stations associated, and STAs with an ERP shall use protection mechanisms for MPDUs transmitted at one of the ERP rates. |

The NonERP Indication Element shall have the following structure:

Three more bytes will be added to the nonERP Indication Element, to be labeled as the Long Slot Directive field The new Long Slot Directive field as follows:

Bit23 (of the 3 new bytes)=LSTTValid

Bits22–bit0 (of the 3 new bytes)=LSTT value

Where bits r2 through r7 are reserved, set to 0, and are ignored on reception. Note that the length of this element is flexible and may be expanded in the future.

All AP and STA for which the value of the MIB dot11ShortSlotTimeOptionImplemented is true, shall maintain an LSTT value which is 64 bits in length.

The LSTT shall have an initial value of ZERO.

The Minimum Long Slot Epoch (MLSE) shall be assigned the value of 4,194,303 usec.

Each AP shall update its LSTT value according to the following rules:

1. At TBTT, before a scheduled beacon transmission, if any non-shortslot capable STAs are associated with the AP, or if the AP has received on its assigned channel of operation, since the last TBTT, any beacon which contains a ShortSlot capability bit value of "0", then the AP shall compute LSTTprime, and transmit the least significant 23 bits of the greater of the value LSTTprime and LSTT in the LSTT field of the beacon frame which is scheduled for transmission at TBTT, where:

LSTTprime=the current TBTT plus MLSE

2. Whenever a beacon is received by the AP on its assigned channel of operation which contains the non-ERP inidication element, and the received LSTTValid bit is true, then the received LSTT value is compared to the local LSTT value. If the received LSTT value represents a later value, then the AP shall replace the least significant 23 bits of the current local LSTT value with the received LSTT value, otherwise, no change to the local LSTT value is made.

Each STA which is not a member of an IBSS shall update its LSTT value according to the following rules:

1. Whenever a beacon is received by the STA on its assigned channel of operation which contains the non-ERP inidication element, and the received LSTTValid bit is true, then the received LSTT value is compared to the local LSTT value. If the received LSTT value represents a later value, then the STA shall replace the least significant 23 bits of the current local LSTT value with the received LSTT value, otherwise, no change to the local LSTT value is made.

Each STA which is a member of an IBSS shall update its LSTT value according to the following rules:

1. At TBTT, before a possible scheduled beacon transmission, if any non-shortslot capable STAs are known to be a member of the IBSS, or if the STA has received on its assigned channel of operation, since the last TBTT, any beacon which contains a ShortSlot capability bit value of "0", then the STA shall compute LSTTprime, and transmit the least significant 23 bits of the greater of the value LSTTprime and LSTT in the LSTT field of the beacon frame which is scheduled for transmission at TBTT, where:

LSTTprime=the current TBTT plus MLSE

2. Whenever a beacon is received by the STA on its assigned channel of operation which contains the non-ERP inidication element, and the received LSTTValid bit is true, then the received LSTT value is compared to the local LSTT value. If the received LSTT value represents a later value, then the STA shall replace the least significant 23 bits of the current local LSTT value with the received LSTT value, otherwise, no change to the local LSTT value is made.

Any STA or AP which receives a valid LSTT value from a beacon which does not originate from that STA's BSS or IBSS shall first translate the LSTT value to its TSF timebase before performing a comparison of received LSTT to local LSTT.

All AP and STA for which the value of the MIB dot11ShortSlotTimeOptionImplemented is false, shall always transmit a "0" in the LSTTValid bit of the nonERP Indication element.

APs and STA which are members of an IBSS shall set the LSTTValid bit to 1 in a transmitted beacon if both of the following conditions are true:

the MIB attribute dot11ShortSlotTimeOptionImplemented is true the LSTT value is later than the TBTT for the beacon APs and STA which are members of an IBSS shall set the LSTT field of all beacons to the current LSTT value if the current LSTT value is later than the TBTT for the beacon and the MIB attribute dot11ShortSlotTimeOptionImplemented is true. Otherwise, the LSTT field shall be set to all zeros. (Note that LSTT update is performed at TBTT, immediately preceding the scheduled transmission of a beacon.)

The LSTTValid bit shall always be set to "0" in all Probe Response frames.

All AP and STA for which the value of the MIB dot11ShortSlotTimeOptionImplemented is false, shall always operate with the Long Slot Time.

All AP and STA which are members of an IBSS, and for which the value of the MIB dot11ShortSlotTimeOptionImplemented is true, shall always operate with the Short Slot Time, unless the current LSTT is later than the current TSF.

All STA which are associated with an AP, and for which the value of the MIB dot11ShortSlotTimeOptionImplemented is true, shall always operate with the Short Slot Time, unless either the current LSTT is later than the current TSF or the STA has received a beacon originating from the AP with which it is associated, containing the value "0" in the ShortSlot subfield of the capability information element.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for operating a Basic Service Set (BSS)/Independent Basic Service Set (IBSS) of a Wireless Local Area Network (WLAN) that services a plurality of WLAN devices (STAs), wherein at least one STA of the plurality of STAs supports multiple slot times, the method comprising:
   initiating operation of the BSS/IBSS of the WLAN using a short slot time;
   determining that operation of the BSS/IBSS requires use of a long slot time, wherein the long slot time is longer than the short slot time; and
   altering operation of at least one of the plurality of STAs to be consistent with the long slot time by:
      using the long slot time;
      setting a local Long Slot Termination Time (LSTT);
      when a Target Beacon Transition Time (TBTT) is before the local LSTT, transmitting a beacon that indicates that the long slot time is to be used and that includes the local LSTT; and
      when the TBTT is after the local LSTT, transmitting a beacon that indicates that the short slot time is to be used.

2. The method of claim 1, further comprising by a STA of the plurality of STAs:
   receiving a beacon from another STA of the plurality of STAs, wherein the beacon includes a remote LSTT;
   when the remote LSTT precedes the local LSTT, ignoring the remote LSTT; and
   when the remote LSTT is later than the local LSTT, writing the remote LSTT as the local LSTT.

3. The method of claim 1, further comprising, when a Timing Synchronization Function (TSF) of the BSS/IBSS is later than the LSTT, reverting to use of the short slot time.

4. The method of claim 1, wherein determining that operation of the BSS/IBSS requires use of a long slot time comprises identifying a STA that associates with the BSS/IBSS and that requires operation with the long slot time.

5. The method of claim 1, wherein determining that operation of the BSS/IBSS requires use of a long slot time comprises:
   identifying a co-channel BSS that requires operation with the long slot time; and
   determining that a service area of the co-channel BSS overlaps with a service area of BSS/IBSS.

6. The method of claim 1, further comprising:
   receiving a beacon from a co-channel BSS/IBSS STA that includes a remote LSTT and a Timing Synchronization Function (TSF);
   normalizing the remote LSTT based upon the TSF to produce a normalized remote LSTT;
   when the normalized remote LSTT precedes the local LSTT, ignoring the remote LSTT; and
   when the remote LSTT is later than the local LSTT, writing the normalized remote LSTT as the local LSTT.

7. The method of claim 6, wherein the beacon further comprises an indication that the long slot time is to be used.

8. The method of claim 1, wherein determining that operation of the BSS/IBSS requires use of a long slot time comprises identifying a co-channel IBSS that requires operation with the long slot time.

9. The method of claim 1, wherein setting the local LSTT includes setting the local LSTT to the sum of a Target Beacon Transition Time (TBTT) and a Minimum Long Slot Epoch (MLSE).

10. A method for operating a WALN device (STA) of an Independent Basic Service Set (IBSS) of a Wireless Local Area Network (WLAN), wherein the STA supports multiple slot times, the method comprising:
   operating the STA using a short slot time;
   determining that operation of the BSS/IBSS requires use of a long slot time, wherein the long slot time is longer than the short slot time; and
   altering operation to be consistent with the long slot time by:
      using the long slot time;
      setting a local Long Slot Termination Time (LSTT);
      when a Target Beacon Transition Time (TBTT) is before the local LSTT, transmitting a beacon that indicates that the long slot time is to be used and that includes the local LSTT; and
      when the TBTT is after the local LSTT, transmitting a beacon that indicates that the short slot time is to be used.

11. The method of claim 10, further comprising:
   receiving a beacon from another STA of the IBSS, wherein the beacon includes a remote LSTT;
   when the remote LSTT precedes the local LSTT, ignoring the remote LSTT; and
   when the remote LSTT is later than the local LSTT, writing the remote LSTT as the local LSTT.

12. The method of claim 10, further comprising, when a Timing Synchronization Function (TSF) of the IBSS is later than the LSTT, reverting to use of the short slot time.

13. The method of claim 10, determining that operation of the IBSS requires use of a long slot time comprises identifying a STA that associates with the IBSS and that requires operation with the long slot time.

14. The method of claim 10, wherein determining that operation of the IBSS requires use of a long slot time comprises:
   identifying a co-channel BSS/IBSS that requires operation with the long slot time; and
   determining that a service area of the co-channel BSS/IBSS overlaps with a service area of BSS/IBSS.

15. The method of claim 10, further comprising:
   receiving a beacon from a co-channel BSS/IBSS STA that includes a remote LSTT and a Timing Synchronization Function (TSF);
   normalizing the remote LSTT based upon the TSF to produce a normalized remote LSTT;
   when the normalized remote LSTT precedes the local LSTT, ignoring the remote LSTT; and
   when the remote LSTT is later than the local LSTT, writing the normalized remote LSTT as the local LSTT.

16. The method of claim 15, wherein the beacon further comprises an indication that the long slot time is to be used.

17. The method of claim 10, wherein determining that operation of the IBSS requires use of a long slot time comprises identifying a co-channel IBSS that requires operation with the long slot time.

18. The method of claim 10, wherein setting the local LSTT includes setting the local LSTT to the sum of a Target Beacon Transition Time (TBTT) and a Minimum Long Slot Epoch (MLSE).

19. A method for operating a WALN device (STA) of a Basic Service Set (BSS)/Independent Basic Service Set (IBSS) of a Wireless Local Area Network (WLAN), wherein the STA supports multiple slot times, the method comprising:
   operating the STA using a short slot time;
   determining that operation of the BSS/IBSS requires use of a long slot time, wherein the long slot time is longer than the short slot time;

receiving a beacon from another STA of the BSS/IBSS, wherein the beacon includes a remote Local Long Slot Termination Time (LSTT);

when the remote LSTT precedes the local LSTT, ignoring the remote LSTT; and when the remote LSTT is later than the local LSTT, writing the remote LSTT as the local LSTT.

20. The method of claim 19, wherein the beacon further comprises an indication that the long slot time is to be used.

21. The method of claim 19, determining that operation of the BSS/IBSS requires use of a long slot time comprises identifying a STA that associates with the BSS/IBSS and that requires operation with the long slot time.

22. The method of claim 19, wherein determining that operation of the BSS/IBSS requires use of a long slot time comprises:

identifying a co-channel BSS that requires operation with the long slot time; and determining that a service area of the co-channel BSS overlaps with a service area of BSS/IBSS.

23. The method of claim 19, further comprising:

receiving a beacon from a co-channel BSS/IBSS STA that includes a remote LSTT and a Timing Synchronization Function (TSF);

normalizing the remote LSTT based upon the TSF to produce a normalized remote LSTT;

when the normalized remote LSTT precedes the local LSTT, ignoring the remote LSTT; and when the remote LSTT is later than the local LSTT, writing the normalized remote LSTT as the local LSTT.

24. The method of claim 23, wherein the beacon further comprises an indication that the long slot time is to be used.

25. The method of claim 19, wherein determining that operation of the BSS/IBSS requires use of a long slot time comprises identifying a co-channel IBSS that requires operation with the long slot time.

26. A Wireless Local Area Network (WLAN) device (STA) that supports multiple slot times, the STA comprising:

a Radio Frequency (RF) interface that supports communications with at least one other STA of the WLAN;

a processor operably coupled to the RF interface; and wherein the RF interface and the processor cooperatively operate to:

commence operations using a short slot time;

determine that operation requires use of a long slot time, wherein the long slot time is longer than the short slot time by:

using the long slot time;

setting a local Long Slot Termination Time (LSTT);

when a Target Beacon Transition Time TBTT) is before the local LSTT, transmitting a beacon that indicates that the long slot time is to be used and that includes the local LSTT; and when the TBTT is after the local LSTT, transmitting a beacon that indicates that the short slot time is to be used.

27. The STA of claim 26, wherein the RF interface and the processor cooperatively operate further to:

receive a beacon from another STA, wherein the beacon includes a remote LSTT;

when the remote LSTT precedes the local LSTT, ignore the remote LSTT; and when the remote LSTT is later than the local LSTT, write the remote LSTT as the local LSTT.

28. The STA of claim 26, wherein the RF interface and the processor cooperatively operate further to:

receive a beacon from a foreign co-channel STA that includes a remote LSTT and a Timing Synchronization Function (TSF);

normalize the remote LSTT based upon the TSF to produce a normalized remote LSTT;

when the normalized remote LSTT precedes the local LSTT, ignore the remote LSTT; and when the remote LSTT is later than the local LSTT, write the normalized remote LSTT as the local LSTT.

29. The STA of claim 26, wherein the STA is a wireless terminal.

30. The STA of claim 26, wherein the STA is an Access Point (AP).

31. A Wireless Local Area Network (WLAN) device (STA) that supports multiple slot times, the STA comprising:

a Radio Frequency (RF) interface that supports communications with at least one other STA of the WLAN;

a processor operably coupled to the RF interface; and wherein the RF interface and the processor cooperatively operate to:

commence operations using a short slot time;

determine that operation requires use of a long slot time, wherein the long slot time is longer than the short slot time by:

using the long slot time;

receiving a beacon from another STA, wherein the beacon includes a remote Local Long Slot Termination Time (LSTT);

when the remote LSTT precedes the local LSTT, ignoring the remote LSTT; and when the remote LSTT is later than the local LSTT, writing the remote LSTT as the local LSTT.

32. The STA of claim 31, wherein the STA is a wireless terminal.

33. The STA of claim 31, wherein the STA is a Access Point (AP).

* * * * *

UNITED STATES PATENT AND TRADEMARK OFFICE
CERTIFICATE OF CORRECTION

PATENT NO. : 7,239,844 B2
APPLICATION NO. : 10/462116
DATED : July 3, 2007
INVENTOR(S) : Matthew Fischer Page 1 of 1

It is certified that error appears in the above-identified patent and that said Letters Patent is hereby corrected as shown below:

Column 13, line 23, in Claim 2: replace "comprising" with --comprising,--

Column 13, line 66, in Claim 10: replace "WALN" with --WLAN--

Column 14, line 59, in Claim 19: replace "WALN" with --WLAN--

Column 15, line 50, in Claim 26: replace "TBTT)" with --(TBTT)--

Signed and Sealed this

Thirty-first Day of March, 2009

JOHN DOLL
*Acting Director of the United States Patent and Trademark Office*